March 25, 1969 R. H. CUSHMAN 3,434,201
TERMINATING AND ENCAPSULATING DEVICES IN
A SINGLE MANUFACTURING OPERATION
Filed Dec. 29, 1966 Sheet 1 of 5

INVENTOR
R. H. CUSHMAN
BY Mann & Jangarathis
ATTORNEYS

March 25, 1969 R. H. CUSHMAN 3,434,201

TERMINATING AND ENCAPSULATING DEVICES IN A SINGLE MANUFACTURING OPERATION

Filed Dec. 29, 1966 Sheet 4 of 5

United States Patent Office 3,434,201
Patented Mar. 25, 1969

3,434,201
TERMINATING AND ENCAPSULATING DEVICES IN A SINGLE MANUFACTURING OPERATION

Robert Holbrook Cushman, Princeton Junction, N.J., assignor to Western Electric Company, Incorporated, New York, N.Y., a corporation of New York Filed Dec. 29, 1966, Ser. No. 605,820
Int. Cl. H01j 9/18; B23k 31/02
U.S. Cl. 29—527 7 Claims

ABSTRACT OF THE DISCLOSURE

An electrical device is positioned in a mold, terminals positioned and soldered in place by injection casting. The mold is then expanded and the device encapsulated also by injection molding.

This invention relates generally to methods of, and apparatus for, terminating and encapsulating devices in a single manufacturing operation, and more particularly to methods of and apparatus for terminating and encapsulating wound capacitors in a single manufacturing operation.

In the manufacture of various devices, a member and a device are terminated, i.e., the member is secured to the device, and the device, and sometimes, at least a portion of the member, are encapsulated. An example of such a device, wel-known in the electrical art, is the cylindrically shaped wound capacitor, comprising convolute layers of conductive and dielectric materials. In the past, various methods and apparatus have been employed to terminate the layers of conductive material with their respective leads, and in separate operations, various other methods and apparatus have been employed to encapsulate the terminated capacitor for protection against the debilitative effects of adverse environmental conditions.

Obviously, beneficial and measurable economies in manufacturing time and effort could be achieved if capacitor termination and encapsulation could both be accomplished in a single manufacturing operation by a single apparatus.

Accordingly, it is a primary object of the present invention to provide methods of and apparatus for terminating and encapsulating a device, for example the wound capacitor, in a single manufacturing operation.

Further, in the process of encapsulating an electrical component such as a capacitor, the problem of centering has perplexed and persisted. Proper centering is desirable since it assures integral and adequate encapsulation with an attendant economy of encapsulation material.

Accordingly, a further object of the present invention is to provide an apparatus for terminating and encapsulating an electrical component such as a capacitor, which properly centers the component during encapsulation.

These and other objects are achieved by the present invention wherein the above-mentioned method of manufacture may include the steps of: engaging a device with a movable injection mold; positioning a member to be secured to the device in the injection mold and adjacent the device; injecting terminating material into the injection mold, around the member, and into a terminating material receiving portion provided on the device, to terminate and secure the member to the device; forming an expandable encapsulating mold around the device utilizing the movable injection mold; injecting encapsulating material into the expandable encapsulating mold to expand the mold and to encapsulate the device; and maintaining the device substantially centrally of the expandable encapsulation mold, during the encapsulation thereof, by slidably supporting the secured member with the movable injection mold.

Apparatus according to the present invention may comprise: a moving injection mold for engaging a device and for positioning a member to be secured to the device adjacent thereto; means for injecting terminating material into the injection mold, around the member, and into a terminating material receiving portion provided on the device, to terminate and secure the member to the device; means for forming cooperatively with said injection mold, and expandable encapsulation mold around the device; means for injecting encapsulating material into the expandable encapsulation mold to encapsulate the device and to expand the encapsulation mold by moving the injection mold; and wherein the movable injection mold is for slidably supporting the device, by the secured member, substantially centrally of the expandable encapsulation mold during the encapsulation thereof.

A more complete understanding of the present invention may be obtained from the following detailed description thereof when read in conjunction with the appended drawings, wherein.

Figures 1, 9, 10:
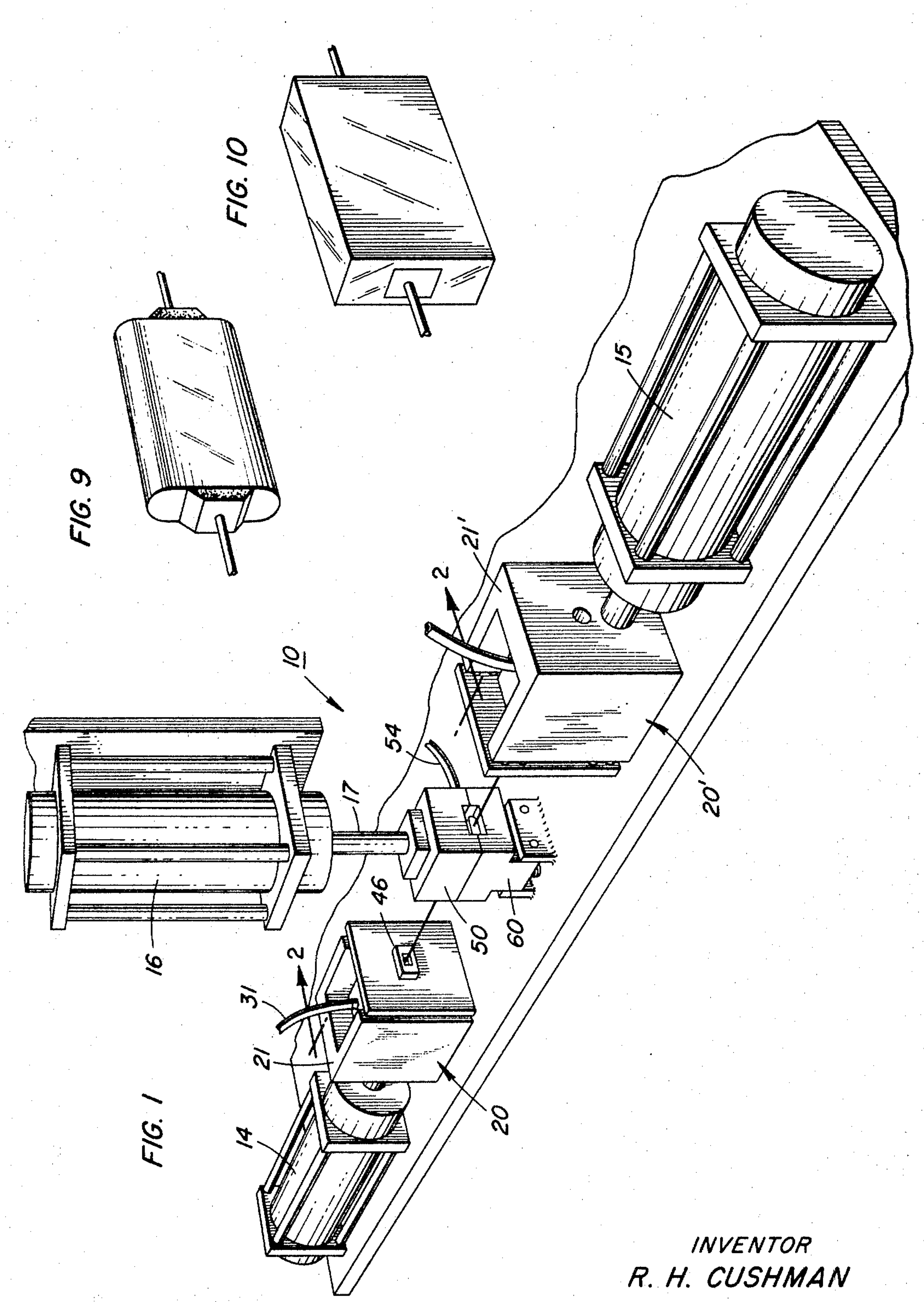
FIG. 1 is a general perspective view of terminating and encapsulating apparatus according to the present invention.
FIGS. 9 and 10 show some of the capacitor shapes which may be achieved through the method and apparatus of the present invention.

Referring now to FIG. 1, there is shown terminating and encapsulating apparatus indicated by the general numerical designation 10, which apparatus embodies the present invention and is suitable for practicing the methods of the present invention. In general operation, an unfinished wound capacitor 12 (FIG. 2), having interstitial spaces in the opposed ends thereof between the layers of material, may be initially positioned for termination and encapsulation by a suitable capacitor feed mechanism (not shown), or manually. Injection type termination devices, indicated generally by the numerical designations 20 and 20', are then moved into operative position by fluid motors 14 and 15, respectively, and capacitor termination is accomplished in a manner to be hereinafter more fully discussed. An upper, movable encapsulating mold segment, indicated generally by the numerical designation 50, is then moved into operative position with respect to a stationary encapsulating mold segment 60 by fluid motor 16 and the now terminated capacitor 12 is encapsulated with suitable material in a manner also to be more fully discussed hereinafter. Injection type termination devices 20 and 20', and the encapsulating mold segment 50, are withdrawn from their operative positions by fluid motors 14, 15 and 16, respectively, and the now terminated and encapsulated capacitor may be removed (manually or by suitable means not shown).

In the preferred embodiment of the present invention, the terminating material is solder, however, any suitable terminating material may be used. Further, in the preferred embodiment, the injection type termination devices 20, 20' are identical in all respects, although this is not necessary, and therefore for convenience only one device 20 will be described fully.

Figure 2:
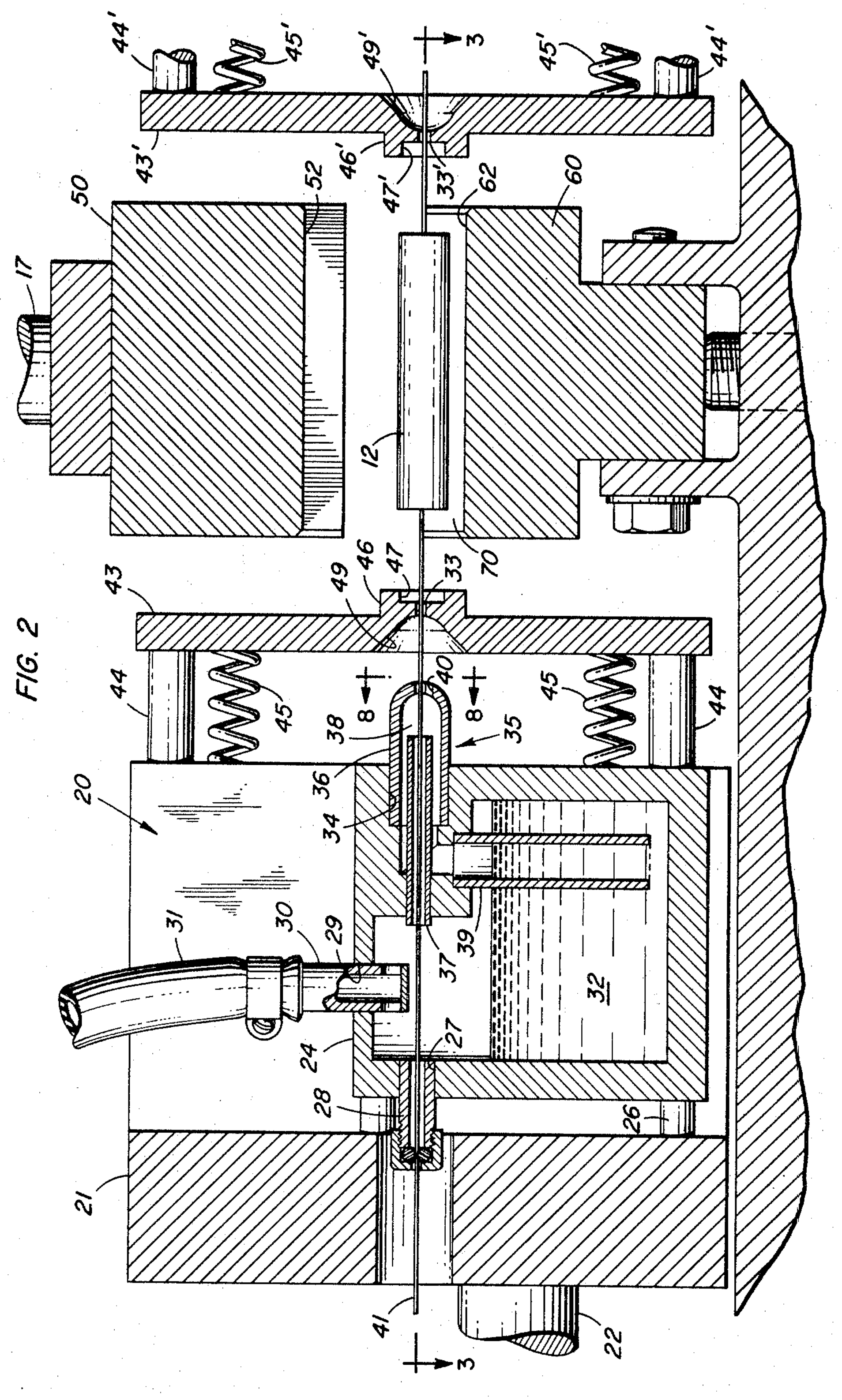
FIG. 2 is a cross-sectional view taken along line 2—2 of FIG. 1, of a solder pot, capacitor chamber, and both mold plates of the present invention.
Figure 3:
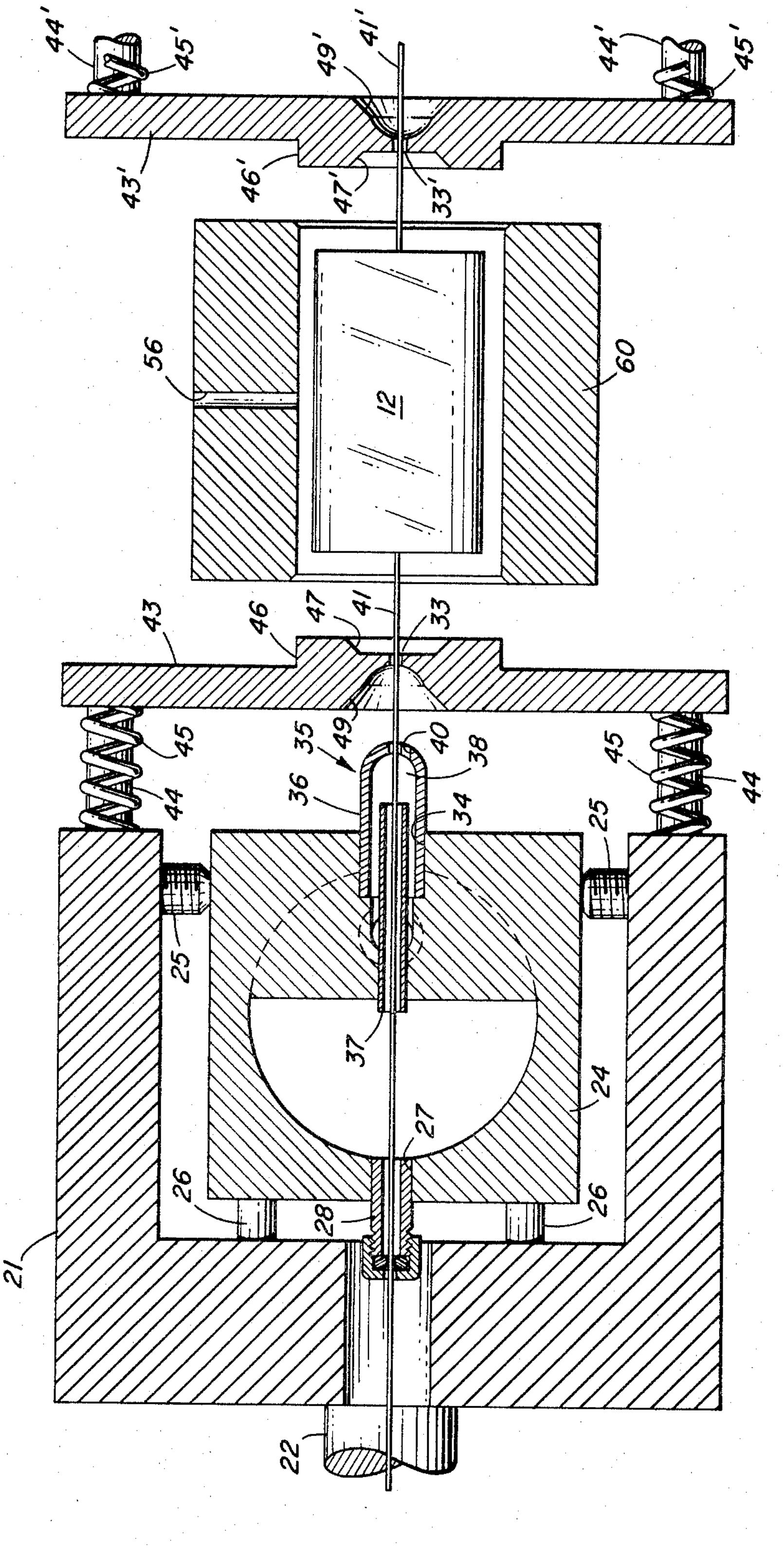
FIG. 3 is a cross-sectional view of the solder pot, capacitor chamber and mold plates as taken along the line 3—3 of FIG. 2.

Referring now to FIGS. 2 and 3, the injection type termination device 20 comprises a U-shaped frame 21 which is rigidly connected to a shaft 22 of the fluid motor 14. A mold plate 43 is rigidly secured to mounting rods 44 which are slidably received in complementary shaped bores (not shown) provided in the ends of the arms of the U-shaped frame 21. The mold plate 43 is normally urged away from the frame 21 by compression springs 45 surrounding the rods 44, and thus is resiliently mounted. As can be best seen in FIG. 2, the mold plate 43 is provided on one face with an injection mold 46 having a suitably shaped counter-bore formed therein defining a mold cavity 47, for encompassing a portion of the end of the capacitor 12. On the other face, the mold plate is provided with a counter-bore 49, shaped as shown, for accommodating the entry and withdrawal of an injection nozzle. The mold plate is also provided with a sprue hole 33 which interconnnects the counter-bores, and which is suitably dimensioned to permit the passage therethrough of the lead wire 41 and a quantity of injected molten solder. The fluid motor 14, when suitably operated, imparts reciprocating movement to the termination device 20.

The termination device 20 includes a solder chamber 24 mounted on rods 26 within the U-shaped frame 21. The chamber 24 is transversely positionable within the frame 21 by the manipulation of set screws 25 (FIG. 3) mounted between the arms of the U-shaped frame 21 and the walls of solder chamber 24.

The solder chamber 24 is basically a six-walled receptacle for containing a supply of molten solder 32 (FIG. 2), and is made of a suitable material, such as stainless steel, and has openings formed therein to accommodate the mounting of various operating structural elements. A first opening 27, FIG. 2, is provided in the back wall of the solder chamber 24, adjacent the base of U-shaped frame 21, for receiving a guide sleeve 28. A second opening 29 is provided in the top wall of the solder chamber 24 for receiving a sleeve 30 to which is attached an air hose 31. The air hose is in communication with a suitable supply (not shown) of compressed air, inert gas or reducing gas. A third opening 34 is provided in the front wall of the solder chamber, opposite the first opening 27, for receiving a solder injection nozzle assembly indicated generally by the numerical designation 35. Solder supply 32 is maintained in a suitably molten state by suitable heating elements (not shown).

The solder injection nozzle assembly 35, FIGS. 2 and 3, comprises a nozzle 36 suitably mounted in the opening 34, a sleeve 37 suitably mounted coaxially within the nozzle 36 and coaxially with the guide sleeve 28, and a tube 39 extending downwardly into the supply of molten solder 32.

Figures 7, 8:
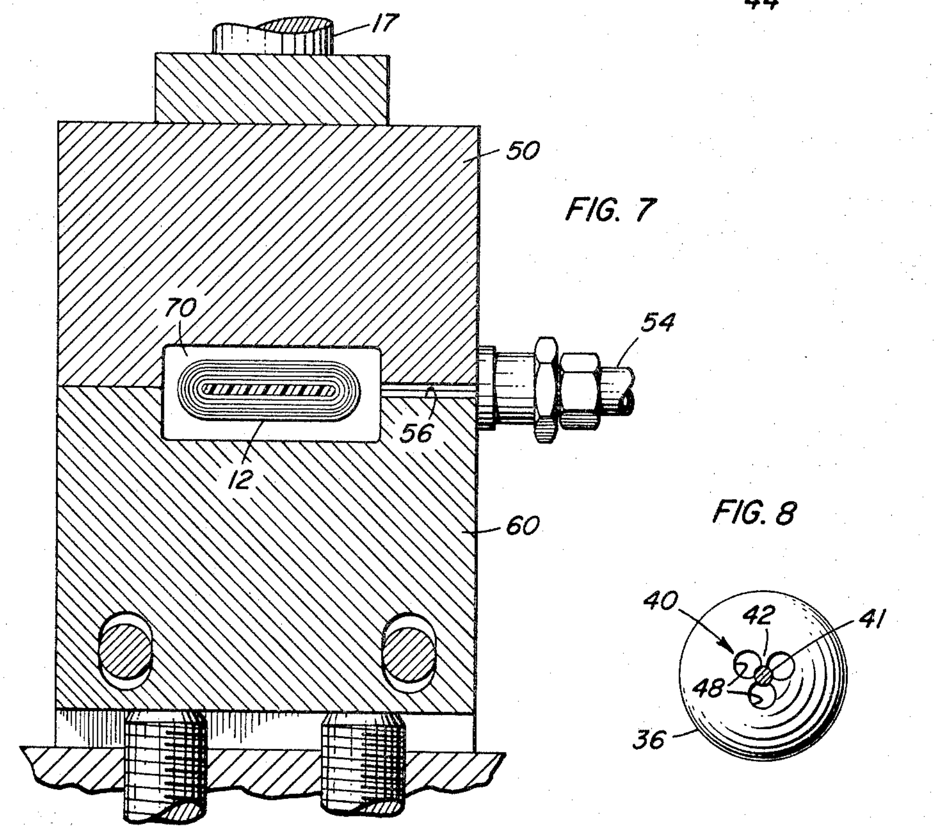
FIG. 7 is a cross-sectional view through the plane 7—7 of FIG. 5.
FIG. 8 is a fragmentary view taken along the plane 8—8 of FIG. 2.

The front end of the nozzle 36 is provided with an orifice, indicated generally by the numerical designation 40, for permitting the passage therethrough of the molten solder and the lead wire 41. The orifice 40, as can be best seen in FIG. 8, is defined by a plurality of openings 48, for permitting the passage therethrough of the molten solder, and a plurality of radially inwardly extending lands or fingers 42 for permitting the passage therebetween of the lead wire 41 and for guiding and supporting the lead wire. As can be seen in FIGS. 2 and 3, the coaxially aligned sleeves 28 and 37, and the plurality of lands or fingers 42, define a path for the introduction of lead wire 41 which is to be connected to the capacitor 12 during termination.

The inner surface of the nozzle 36 and the outer surface of the sleeve 37 form a passageway 38 also for permitting the passage therethrough of the molten solder 32.

Accordingly, it will be understood, that when it is desired to eject molten solder through the nozzle orifice 40, a pulse of air will be introduced into the solder chamber 24 through the air hose 31, and the pulse of air will displace a quantity of molten solder from the supply 32. The displaced molten solder will be forced upwardly through the tube 39, around the sleeve 37 and through the passageway 38, and will be ejected through the nozzle orifice 40 by passing around the lead wire 41 through the plurality of openings 48.

Referring now to the upper and lower encapsulating mold segments 50 and 60, respectively, the mold segments cooperate with the termination devices 20 and 20' to form an expandable encapsulating mold 70. As is shown in FIGS. 1 and 2, the upper mold segment 50 is mounted for reciprocating movement, into and out of the encapsulating position as shown in FIGS. 2 and 3, by being fixedly secured to the piston 17 of the fluid motor 16. The inner, opposed mold surfaces 52 and 62 of the respective mold segments 50 and 60 are generally complementary in configuration to the outer surfaces of the injection molds 46 and 46', being U-shaped as indicated in FIG. 1. When the upper mold segment 50 is moved into its downwardmost position by the fluid motor 14, the upper and lower mold segments mate, the respective inner surfaces 52 and 62 encompass the side of the capacitor 12 in spaced relationship, and the respective end portions of the mold segments encircle, in sealing engagement, the injection molds 46 and 46'. So positioned, the injection molds 46 and 46', and the encapsulating mold segments 50 and 60, form cooperatively, an expandable encapsulation mold, i.e., define the chamber or void 70 surrounding the outer surface of the capacitor 12.

The encapsulation mold is expandable in that the mold plates 43, 43' and therewith the injection molds 46, 46', respectively, are slidable away from each other and away from the respective ends of the capacitor 12 (see FIGS. 5 and 6) in response to force exerted against the injection molds 46 and 46' by the injection of suitable encapsulation material into the encapsulation mold 70. The amount of movement of mold plates 43 and 43', in response to the pressure of the encapsulating material, may be limited suitably, such as by mechanical stops (not shown).

The encapsulating mold segments are provided with mating, semi-apertured portions which, when the mold segments are closed, provide a sprue hole 56 for the admission of encapsulating material into the expandable encapsulation mold. The encapsulating material, which may be selected from the encapsulating plastics which are known to those skilled in the art, is supplied at suitable high pressure, from 2,000 to 20,000 p.s.i. for example, through a tube 54 which is connected to the sprue hole 56; the tube 54 being in communication with some suitable supply of encapsulating material, not shown.

Figure 4:
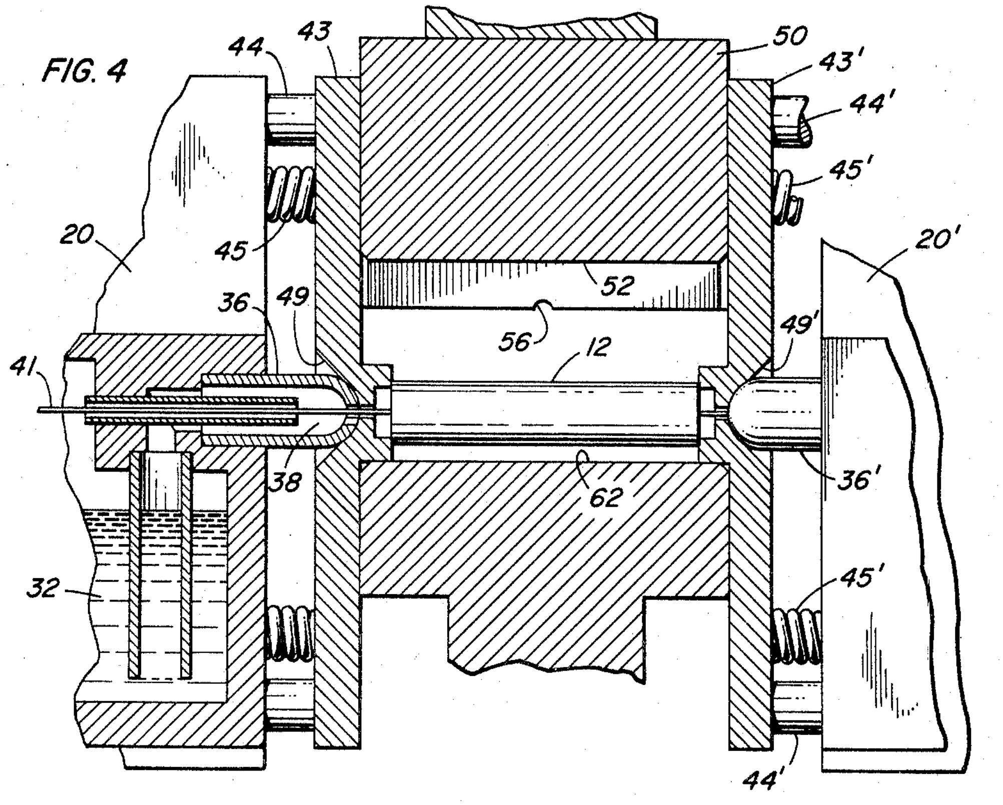
FIG. 4 is a cross-sectional view, partially cut away, similar to the view of FIG. 2, but showing the apparatus of the present invention in position for termination.

In the practice of the methods of the present invention, a capacitor 12 to be terminated and encapsulated is initially positioned as shown in FIG. 2, with the injection type termination devices 20 and 20' and the encapsulating mold segments 50 and 60 in their retracted positions. As stated above, the capacitor can be so positioned, initially, either manually or by suitable clamping means such as a pair of reciprocating jaws, not shown. The termination devices 20 and 20' are then advanced toward each other by the fluid motors 14 and 15, respectively, until the injection molds 46 and 46' supportingly engage the ends of the capacitor 12 as shown in FIG. 4. The capacitor 12, now being supported between the injection molds 46 and 46', the fluid motors 14 and 15 continue to advance the termination devices 20 and 20' which causes the respective U-shaped frames 21 and 21' and solder chambers 24 and 24' to slide along mounting rods 44 against the force of the springs 45 until the solder nozzles 36 and 36' are seated in the respective bores 49 and 49' of the mold plates 43 and 43'; such continued advancement may be suitably limited by mechanical stops not shown. Lead wire 41 and 41' is slidably advanced and positioned adjacent the ends of the capacitor 12.

Compressed air is introduced into the solder chamber 24 and a quantity of molten solder is forced upwardly through the tube 39, through the passageway 38, through the plurality of openings 48 of the nozzle orifice 40, through sprue hole 33 and around the lead wire 41, and into engagement with the end of the capacitor 12. The injected molten solder indicated generally by the numerical designation 64, is pressurized sufficiently to cause the molten solder to penetrate predetermined distances into the interstitial spaces, in the ends of the capacitor, formed by the convolute layers of conductive and dielectric material comprising the capacitor. It will be understood that the injected solder 64 solidifies or cools rapidly due to contact with the relatively massive solder injection mold plates 43 and 43' which act as large heat sinks, the mold plates remaining relatively cool due to their only intermittent exposure to the molten terminating materials. Such rapid cooling of the injected molten solder prevents any injurious effect on the capacitor due to termination. The cooled, injected solder mechanically and electrically secures the lead wire 41 to the ends of the capacitor, and the capacitor is terminated.

The manner of capacitor injection termination, per se, being set forth more fully in a copending patent application Ser. No. 267,471, filed Mar. 25, 1963, in the name of R. H. Cushman and J. A. Hosford, and assigned to the Western Electric Co., Inc.

Figure 5:
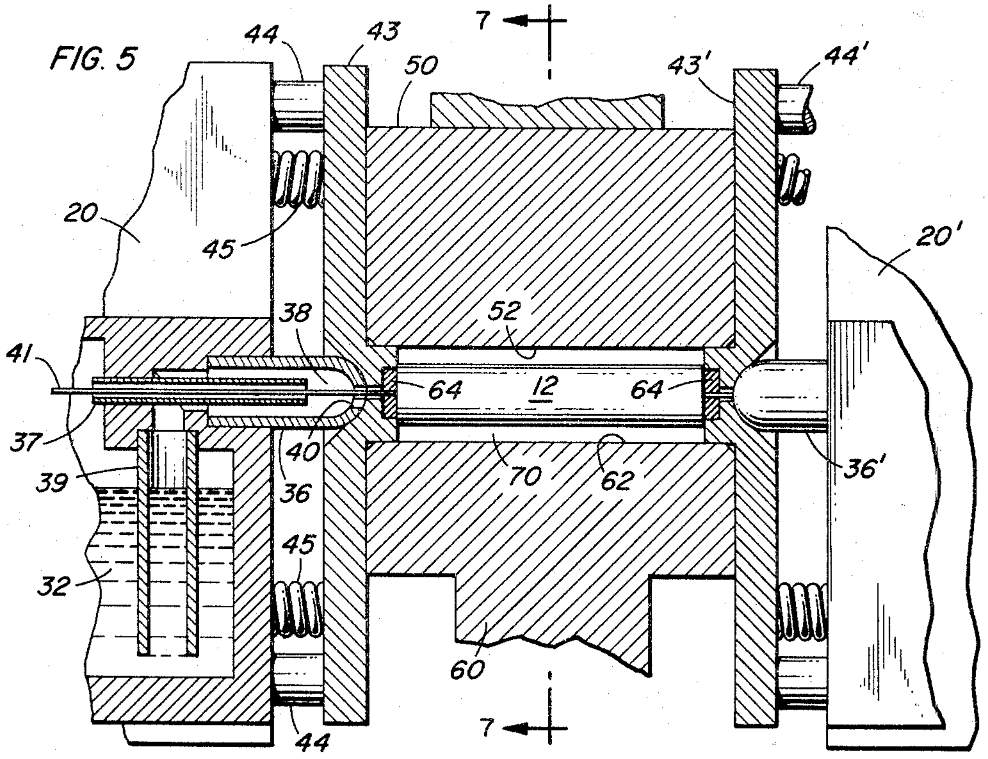
FIG. 5 is a view similar to that of FIG. 4, showing the termination material as having been introduced.

After the injected solder has cooled and the termination of the capacitor is completed, or concurrently therewith if desired, the upper encapsulating mold segment 50 is moved downwardly to the position shown in FIG. 5, to complete the expandable encapsulation mold 70 described above.

Figure 6:
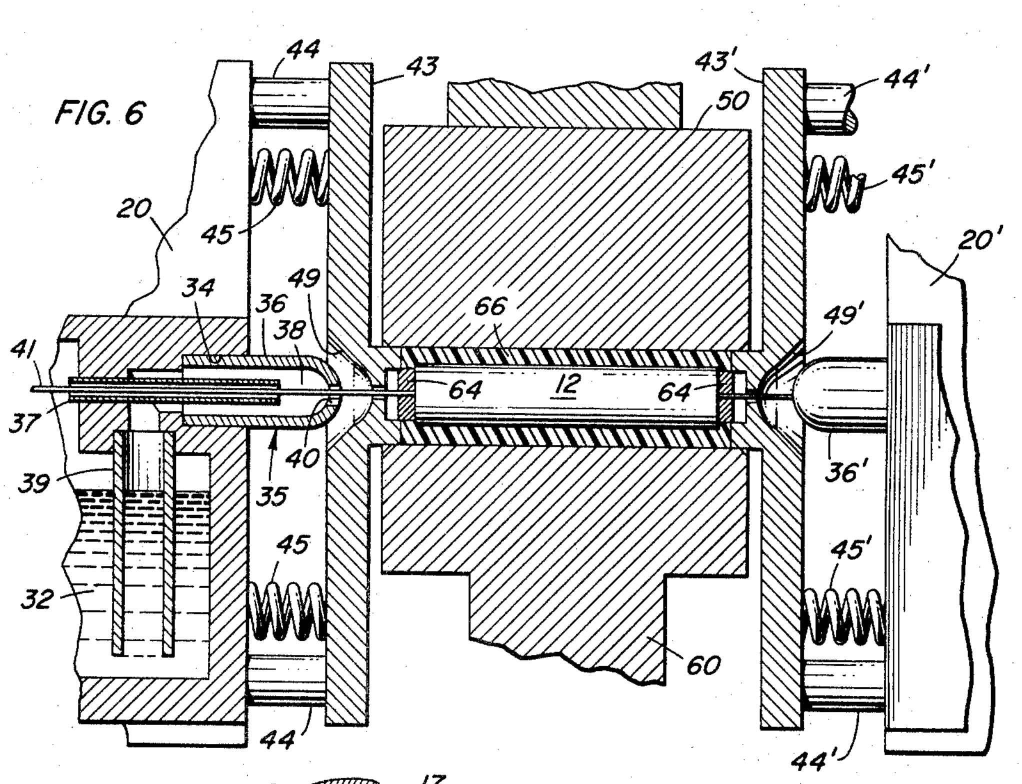
FIG. 6 is a view similar to FIG. 4, showing the capacitor having been encapsulated.

After the injected solder has cooled, suitable encapsulation material, indicated generally by the numerical designation 66 in FIG. 6, is injected through the tube 54 and sprue hole 56 into the expandable encapsulation mold or void 70. As the injected encapsulation material 66 fills the void, pressure builds up and force is thereby exerted against the opposed injection molds 46 and 46'. The exerted force is sufficiently great to move or displace the mold plates 43 and 43' away from each other, against the action of the springs 45 and 45', and away from the ends of the capacitor, thereby moving the mold plates (and injection molds therewith) from the positions shown in FIG. 5 to the positions shown in FIG. 6. The injected encapsulation material will then surround portions of the ends of the capacitor. Air, otherwise trapped in the expandable mold, is exhausted through the sprue holes 33 and 33' of the mold plates 43 and 43', respectively.

It will be understood that, as the mold plates 43 and 43' were being forced away from the respective ends of capacitor 12 by the force of the injected encapsulation material, the capacitor 12 was separated from its prior source of support, viz, the injection molds 46 and 46'. Since lead wires 41 and 41' were secured to the capacitor at termination, they can be used to thereafter support the capacitor 12 by cooperating with the fingers 42, 42', of orifices 40, 40', which fingers as the mold plates are moved away from the ends of the capacitor, axially and slidingly support the capacitor substantially centrally of the mold during encapsulation. Accordingly, it will be appreciated that as the mold plates 43 and 43', and injection molds 46 and 46' therewith, are forced away from the ends of the capacitor by the accumulating encapsulation material 66, support of the capacitor is transferred from the faces or ends of the injection molds to the fingers 42 and 42', which fingers support the capacitor substantially centrally of the expandable mold 70 as the mold expands. Thus, the terminated capacitor is encapsulated uniformly and integrally and with an economy of encapsulation material.

The encapsulation material is solidified or cooled rapidly by the presence of the encapsulating mold segments 50 and 60, primarily, which segments, due to their comparative massiveness, act as large heat sinks. The encapsulation material 66 is allowed to cool and harden. The termination devices 20 and 20' are retracted by their associated fluid motors to the positions shown in FIG. 2, with the fingers 42 and 42' sliding axially of the terminated lead wires 41 and 41'.

The terminated lead wires 41 and 41' may then be cut manually, or can be cut by suitable cutting means (not shown) which can be suitably moved into position by appropriate apparatus (not shown).

Concurrently with the cutting of the capacitor leads, or thereafter if desired, the upper encapsulating mold segment 50 is retracted by its associated fluid motor to its upward position shown in FIG. 4. The capacitor 12 may then be suitably removed, having been terminated and encapsulated in a single manufacturing operation.

Referring now to FIG. 7, it will be understood that by suitably shaping the inner surfaces 52 and 62 of the encapsulating mold devices, the encapsulated capacitor can be provided with virtually any external configuration. For example as shown in FIG. 7, the inner surfaces are shaped so as to define a rectangular encapsulation mold, and the encapsulated capacitor, as shown in FIG. 10, will be provided with a rectangular external configuration.

As illustrated by the capacitors shown in FIGS. 9 and 10, the capacitor can be provided with different external configurations. The different encapsulation shapes are provided by the appropriate complementary shaping of the mold segments 50 and 60.

It will be understood by those skilled in the art that the injection nozzle 36 could comprise a series of readily replaceable nozzle inserts for accommodating various sized lead wires. Further, that the mold plates 43, rather than being provided with an integrally formed injection mold 46, could be provided with an aperture into which could be fitted any one of a series of injection mold inserts, each insert having a different sized sprue hole 33 for accommodating a different sized lead wire. Also, the mold plates could be provided with means (adjustable set screws for example) for adjustably aligning the injection molds with the injection nozzles 36, the ends of the capacitors, and the mold segments 50 and 60.

Obviously, numerous modifications and variations of the present invention are possible in the light of the above teachings. It is therefore to be understood that while the present invention has been taught in the specific context of a wound capacitor, the invention is not so limited, and further that within the scope of the appended claims, the invention may be practiced otherwise than as specifically described therein.

What is claimed is:

1. The method of terminating and encapsulating in a single manufacturing operation, a device having a terminating material receiving portion, comprising:
- engaging said device with a movable injection mold;
- positioning a member to be secured to said device in said injection mold and adjacent said device;
- injecting terminating material into said injection mold, around said member, and into said terminating material receiving portion of said device to secure said member to said device;
- forming an expandable encapsulation mold around said device utilizing said injection mold;
- injecting encapsulating material into said expandable encapsulation mold to expand said encapsulation mold and to encapsulate said device; and
- maintaining said device substantially centrally of said expandable encapsulation mold, during the encapsulation thereof, by slidably supporting said secured member with said movable injection mold.

2. The method of terminating and encapsulating in a single manufacturing operation, a component having terminating material receiving portions, comprising:
engaging said component with movable injection molds having mold cavities formed therein;
positioning lead in said mold cavities and adjacent said component;
injecting terminating material into said mold cavities around said leads, and into said terminating material receiving portions of said component;
solidifying said terminating material to terminate said capacitor and secure said leads thereto;
forming an expandable encapsulation mold around said device utilizing parts of said injection molds;
injection encapsulating material into said expandable encapsulation mold to expand said encapsulation mold by moving said injection molds, and to encapsulate said component; and
maintaining said component substantially centrally of said expandable encapsulation mold, during the encapsulation thereof, by slidably supporting said secured leads with said movable injection molds.

3. The method of terminating and encapsulating in a single manufacturing operation, a wound capacitor comprised of convolute layers of conductive and dielectric materials and having interstitial spaces in the ends thereof between said layers of material, comprising:
engaging the ends of said capacitor with movable injection molds having mold cavities formed therein;
positioning leads in said mold cavities adjacent the ends of said capacitor;
injecting terminating material into said mold cavities around said leads, and into the interstitial spaces in the ends of the capacitor;
solidifying said terminating material to terminate said capacitor and secure said leads to the opposite ends thereof;
forming an expandable encapsulation mold around said capacitor utilizing encapsulating mold segments and said movable injection molds;
injecting encapsulating material into said expandable encapsulation mold to expand said encapsulation mold and to encapsulate said capacitor; and
maintaining said capacitor substantially centrally of said expandable encapsulation mold, during the encapsulation thereof, by slidably supporting said capacitor by said secured lead with said movable injection molds.

4. The method of terminating and encapsulating, in a single manufacturing operation, a wound capacitor comprised of convolute layers of conductive and dielectric materials and having interstitial spaces in the ends thereof between said layers of materials, comprising:
surrounding portions of the ends of the capacitor with movable solder injection molds having mold formed cavities therein;
positioning leads centrally of sprue holes formed in said solder injection molds and adjacent the ends of the capacitor;
injecting solder into said mold cavities around said leads, and into the interstitial spaces formed in the ends of the capacitor;
rapidly cooling said solder to terminate said capacitor and secure the leads to the ends thereof;
forming an expandable encapsulation mold around said capacitor by surrounding the outer surface of said capacitor, and at least portions of said solder injection molds, with encapsulation mold segments;
injecting encapsulation material into said expandable encapsulation mold to surround the outer surface of said capacitor and to move said solder injection molds away from the ends of said capacitor to expand said encapsulation mold and permit said encapsulation material to also surround at least portions of the ends of said capacitor;

axially and slidably supporting said secured leads with said solder injection molds to position said terminated capacitor substantially centrally of said expandable encapsulation mold during said encapsulation; and
cooling said encapsulation material.

5. The method of terminating and encapsulating, in a single manufacturing operation, a wound capacitor comprised of convolute layers of conductive and dielectric materials and having interstitial spaces in the ends thereof between said layers of material, comprising:
positioning movable injection type termination devices, having mold cavities therein, at opposite ends of the capacitor to support the capacitor;
positioning leads in said mold cavities adjacent said opposite ends of said capacitor;
injecting terminating material into said mold cavities around said leads, and into the interstitial spaces in the ends of the capacitor;
forming an expandable encapsulation mold around said capacitor by surrounding the outer surface of said capacitor, and portions of said termination devices with encapsulating mold segments;
injecting encapsulating material into said expandable encapsulation mold to expand said encapsulation mold and to surround the sides and portions of the ends of said capacitor; and
transferring the support of said capacitor from said injection mold devices to said secured lead wires during encapsulation.

6. Apparatus for terminating and encapsulating, in a single manufacturing operation, a generally cylindrically shaped wound capacitor comprised of convolute layers of conductive and dielectric material and having interstitial spaces in the ends thereof between said layers of materials, comprising:
movable injection molds having mold cavities for enclosing at least a portion of the ends of the capacitor and having means for positioning leads adjacent the ends of the capacitor:
means for injecting terminating material into said mold cavities, around said leads, and a predetermined distance into the interstitial spaces in the ends of the capacitor to terminate said capacitor and secure the leads to the ends thereof;
encapsulating mold segments for forming cooperatively with said movable injection molds an expandable encapsulation mold around said capacitor;
means for injecting encapsulating material into said expandable encapsulation mold to encapsulate said capacitor and to expand said encapsulation mold; and
said movable injection molds for slidably supporting said capacitor by said leads substantially centrally of said expandable encapsulation mold during said encapsulation.

7. Apparatus for terminating and encapsulating, in a single manufacturing operation, a cylindrically shaped wound capacitor comprised of convolute layers of conductive and dielectric material, and having interstitial spaces in the ends thereof between said layers of material, comprising:
a pair of opposed, slidably mounted injection type termination devices, each device including a resiliently mounted injection mold which mold provides a mold cavity for encompassing at least portions of the ends of said capacitor and which injection mold includes a sprue hole for admitting terminating material into said mold cavity and a plurality of radially disposed lands extending into said sprue hole and for axially positioning leads adjacent the ends of said capacitor;
means for moving said termination devices toward each other to move said injection molds into said capacitor encompassing positions;
means, integral with said termination devices, for injecting terminating material through said sprue holes a predetermined distance into interstitial spaces formed in the ends of the capacitor to terminate said capacitor and secure said leads to the opposite ends thereof;

a pair of opposed, encapsulating mold segments for surrounding the outer surface of the capacitor, in spaced relationship, and for tightly encircling at least portions of said injection molds, said mold segments having a sprue hole formed therein for the admission of encapsulating material;

said encapsulating mold segments and at least portions of said injection molds for forming, cooperatively, an expandable encapsulation mold around said capacitor;

means for injecting encapsulating material into said encapsulation mold to surround the outer surface of said capacitor and to exert pressure against the opposed ends of said resiliently mounted injection molds;

said resiliently mounted injection molds, in response to said exerted pressure, being movable a predetermined distance away from each other, away from the ends of said capacitor, and axially of said leads to permit said encapsulating material to also surround a portion of the ends of said capacitor; and said plurality of lands provided in said injection molds for axially and slidably supporting said secured leads to position said terminated capacitor substantially centrally of said expandable encapsulation mold during said encapsulation.

References Cited

UNITED STATES PATENTS

| | | | |
|---|---|---|---|
| 1,658,990 | 2/1928 | Keene | 264—272 X |
| 2,363,107 | 11/1944 | Young | 264—317 |
| 3,200,471 | 8/1965 | Johnson et al. | 29—621 |
| 3,277,350 | 10/1966 | Pearce et al. | 264—272 X |
| 3,355,532 | 11/1967 | Bracht et al. | 264—272 X |
| 3,374,536 | 3/1968 | Schroeder et al. | 29—621 X |
| 3,387,364 | 6/1968 | Boggs | 29—621 |
| 3,389,461 | 6/1968 | Hardart | 264—272 X |

JOHN F. CAMPBELL, *Primary Examiner.*

P. M. COHEN, *Assistant Examiner.*

U.S. Cl. X.R.

29—25.13, 25.19, 203, 503, 621; 264—272, 314